United States Patent
Westerberg et al.

(10) Patent No.: US 7,468,176 B2
(45) Date of Patent: Dec. 23, 2008

(54) FEEDING DEVICE AND PROCESS AND FEEDING SYSTEM WHICH UTILIZE THE FEEDING DEVICE

(76) Inventors: Lennart Westerberg, 3617 Scenic Dr., Mobile, AL (US) 36605; George W. Bearry, 120 Mansfield Dr., Natchez, MS (US) 39120; Patrik Lownertz, Backelidsgatan 1 S-654 65, Karlstad (SE); Don Parker, 1918 Simerson Rd., Lynwood, NC (US) 27299

( * ) Notice: Subject to any disclaimer, the term of this patent is extended or adjusted under 35 U.S.C. 154(b) by 448 days.

(21) Appl. No.: 11/346,928

(22) Filed: Feb. 3, 2006

(65) Prior Publication Data

US 2006/0127298 A1      Jun. 15, 2006

Related U.S. Application Data

(62) Division of application No. 10/031,277, filed as application No. PCT/SE99/00773 on May 7, 1999, now abandoned.

(51) Int. Cl.
  *C01F 11/00*    (2006.01)
  *C01D 1/00*     (2006.01)
(52) U.S. Cl. .................. 423/640; 162/30.11; 162/32; 423/635; 423/594.16
(58) Field of Classification Search ................. 423/640
  See application file for complete search history.

(56) References Cited

U.S. PATENT DOCUMENTS

| 3,268,388 | A | * | 8/1966 | Bauman et al. | ............. 162/30.1 |
| 5,145,556 | A | * | 9/1992 | Westerberg et al. | ........... 162/29 |
| 5,753,075 | A | * | 5/1998 | Stromberg et al. | ............ 162/52 |

* cited by examiner

*Primary Examiner*—Jennifer McNeil
*Assistant Examiner*—Sheng Han
(74) *Attorney, Agent, or Firm*—Rolf Fasth; Fasth Law Offices

(57) ABSTRACT

Feeding device for feeding burned lime to a reaction vessel for causticizing soda liquor to caustic soda. The feeding device, in its upper part, has an inlet for receiving slurry of the burned lime and the soda liquor for formation of said slurry inside said feeding device. The system further comprises a tall and slender feed vessel having a lower part having an outlet defined therein for the slurry. The outlet, via a pump, is operatively connected to the reaction vessel. The process and the feeding system utilize the feeding device, in which process the slurry is created of the burned lime and a first part of the soda liquor, a second part being preheated before addition to the slurry, whereafter slaking and causticizing reactions are completed under elevated temperature and pressure.

9 Claims, 2 Drawing Sheets

FEEDING DEVICE AND PROCESS AND FEEDING SYSTEM WHICH UTILIZE THE FEEDING DEVICE

PRIOR APPLICATIONS

This application is a divisional application of U.S. Ser. No. 10/031,277 now abandoned; filed Dec. 23, 2002; which is a U.S. national phase patent application of PCT/SE99/00773; filed May 7, 1999.

TECHNICAL FIELD

The present invention relates to a feeding device for feeding burned lime to a reaction vessel for causticizing a soda liquor to caustic soda. The invention also relates to a process for reacting a soda liquor with burned lime for production of caustic soda, which process utilizes said feeding device. Furthermore, the invention relates to a feeding system which utilizes said feeding system.

BACKGROUND AND SUMMARY OF THE INVENTION

In the kraft pulping industry in which cellulose containing raw material is treated at high temperatures with cooking chemicals to yield cellulose pulp, it is of vital economic and environmental importance to recover and regenerate the spent cooking liquor with its dissolved wood substance as well as the cooking chemicals. This is achieved by extracting spent (black) cooking liquor from the digesters and further by washing the pulp discharged from the digesters with water, evaporating the liquor obtained and then combusting the evaporated liquor in a recovery boiler. From the bottom of the recovery boiler a smelt is taken out and dissolved in water to form a soda liquor (green liquor) which is absolution of mostly sodium carbonate and sodium sulphide. Alternatively, the soda liquor may be produced by substoichiometric gasification of the spent cooking liquor. The sodium carbonate content of the soda liquor is converted to sodium hydroxide by the addition of burned lime (CaO) in the so called causticizing process. In the causticizing process the burned lime forms insoluble lime mud ($CaCO_3$) which is separated from the caustic liquor —called white liquor —in a subsequent filtration step. The white liquor is thereafter reused as cooking liquor in the kraft cooking of the cellulose containing raw material.

The chemical reaction in the causticizing process proceeds in two reaction steps. In the first reaction step, usually carried out in an atmospheric so called lime slaker, the burned lime consisting mostly of calcium oxide is slaked by the water content of the green liquor to form hydrated lime.

$$CaO(s)+H_2O\_Ca(OH)_2(S) \quad (1)$$

This first reaction is called the slaking reaction and it is rapid and strongly exothermic.

In the second reaction step the dissolved carbonate in the green liquor combines, conventionally in several atmospheric agitated reactor tanks in series, with the calcium in the slaked lime to form lime mud. At the same time the hydroxide content of the slaked lime goes into solution.

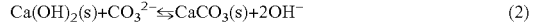
$$Ca(OH)_2(s)+CO_3^{2-} \leftrightarrows CaCO_3(s)+2OH^- \quad (2)$$

This second reaction is slower than the first reaction and is also an equilibrium reaction which means that all the dissolved carbonate will not react even if a surplus of burned lime is added.

It is further known in the art, from for example SE 504 212, to perform the causticizing at elevated pressure and temperature. The elevated temperature makes the causticizing reaction (2) proceed faster and the pressurized design prevents boiling and thus loss of the heat of reaction of the exothermic slaking reaction. Thus the heat of reaction can be preserved at the same time as it is utilized to increase the reaction rate of the second, slower reaction.

From U.S. Pat. No. 4,627,888 it is known to perform a pressurized slaking process where the soda liquor to be causticized is divided into two parts, the first part being used for the slaking and the second part being added after the slaking for the actual causticizing process.

It has also been shown that if the product white liquor/lime mud slurry is kept under elevated pressure and temperature during a succeeding separation step, a further benefit can be elicited. As the viscosity of the white liquor is lower at higher temperature the capacity of a given filter can be higher at this temperature resulting in reduced filter size for a given capacity.

In conventional recausticizing systems, whether atmospheric or pressurized, the storage silo for burned lime is placed directly above or adjacent to the lime slaker and the burned lime is being fed to the slaker by one or several solids materials conveyors. This solution has some disadvantages. If placed directly above the slaker, the structure for the storage silo becomes expensive as will the conveying system of burned lime from the lime kiln (where lime mud is reburned to CaO) to the silo. If placed more remotely from the slaker and in close vicinity to the lime kiln discharge, the conveyors to the slaker will instead become expensive. These disadvantages could be overcome if the lime slaker reactor could be fed by pumping burned lime from the storage silo as a slurry in green or white liquor. However such pumping of slurry does in itself have its difficulties:

The lime slaking reaction is rapid and strongly exothermal so if slurried in hot liquor the liquor may be brought close to or to boiling reducing the available net pressure suction height (NPSH) for the slurry pump. This may cause the slurry pump to cavitate.

The burned lime often contains oversize material, refractory or metal trash that may block or damage the feed pump or piping.

Other problems that are identified in conventional recausticizing systems are e.g. that feed-back control is complicated by the slow reaction (2) which is performed in a series of vessels and that the process equipment requires a large space.

The present invention provides a feeding device in a slurry pumping system that overcomes the above difficulties, and also provides a process which utilizes said feeding device.

Hence, there is provided a feeding device for feeding burned lime to a reaction vessel for causticizing a soda liquor to caustic soda, wherein said feeding device, in its upper part, comprises an inlet for a slurry of said burned lime and said soda liquor, or inlets for said burned lime and said soda liquor, respectively, for enabling formation of said slurry inside said feeding device, and wherein said feeding device comprises a feed vessel of tall and slender shape, which feed vessel in its lower part comprises an outlet for said slurry, which outlet, via one or more pump(s), is operatively connected to said reaction vessel.

The feed vessel preferably presents an internal liquor level of at least 1.5 meters, preferably at least 2 meters and most preferably at least 3 meters, whereas its inner diameter depends on the size of the slurry flow through the feed vessel and on the retention time, which is 10-150 seconds, preferably 20-120 seconds and even more preferred 30-60 seconds, giving an inner diameter of about 0.1-1.5 meters, preferably 0.2-1 meters and most preferably 0.3-0.8 meters. By the tall and slender shape of the feed vessel, a shape that is commonly referred to as a stand pipe, there is created a possibility to form a pumpable slurry of the burned lime and soda liquor, which slurry thus is formed in a volume which is small enough to prevent the exothermic reaction (1) from proceeding far enough to cause boiling, at the same time as a hydrostatic pressure, due to the height of the liquor level in the feed vessel, prevents the downstream one or more pump(s) from cavitating.

According to one aspect of the invention, the feeding device, in said upper part thereof, comprises a cyclone including said inlets for the burned lime and the soda liquor, respectively, for enabling formation of said slurry inside the cyclone or just below the cyclone.

According to another aspect of the invention, the feeding device further comprises a trash trap, which trash trap preferably constitutes a liquid filled branch-off to said feed vessel, which trash trap comprises means for discharging coarse burned lime or other non desired solid material, and which trash trap also comprises an inlet, at the bottom part thereof, for soda liquor and/or comprises an agitator device, such as for example a propeller or other agitator paddle.

According to yet another aspect of the invention, the one or more pump(s) is/are especially designed to handle a slurry with a substantial amount of coarse burned lime and at least one of the pumps (preferably the first one) is designed to crush oversized burned lime between a rotor part and a stationary part in the pump.

The invention further presents a process for reacting a soda liquor with burned lime, by combined slaking and causticizing, for production of caustic soda, comprising the steps of
 (a) forming a slurry of said burned lime and a first part of said soda liquor and allowing said slurry a retention time of 10-150 seconds in a feed vessel,
 (b) preheating a second part of said soda liquor,
 (c) combining said slurry from step (a) and said preheated second part of said soda liquor of step (b),
 (d) maintaining the combined slurry and liquor at an elevated pressure and at an elevated temperature for completion of the reaction between the burned lime and the soda liquor to yield caustic soda and lime mud.

According to one aspect of the process of the invention, said first part of said soda liquor constitutes about ⅓ to ½ of the entire amount of soda liquor which participates in the reaction, whereas said second part of said soda liquor constitutes about ½ to ⅔ of the entire amount of soda liquor which participates in the reaction. By dividing the soda liquor into these two streams, there can be created a slurry of the burned lime and the first part of the soda liquor, which slurry, due to the short retention time of step (a), will not have time to completely undergo the exothermic reaction (1) above before it is pumped into the pressurized reaction vessel, where the reactions (1), (2) are completed. By preheating a second part of the soda liquor, preferably by indirect heat exchange against a product caustic soda (white liquor), the reaction rate is further speeded up so that the reactions can be completed in a very short period of time and in process equipment which is much smaller and less space requiring than in conventional systems.

According to another aspect of the invention, said feed vessel is filled with enough liquid/slurry to provide a hydrostatic pressure high enough prevent boiling due to an exothermic reaction between said burned lime and said soda liquor.

According to yet another aspect of the invention, the process proceeds with the steps of, (e) allowing coarse, un-reacted, burned lime to settle and thereafter discharging it,
 (f) filtering said lime mud and caustic soda under elevated pressure and elevated temperature, preferably about the same temperature as in step (d), in order to separate said caustic soda from said lime mud.

The invention further presents a feeding system for feeding burned lime to a reaction vessel for causticizing a soda liquor to caustic soda, which feeding system comprises:
 (aa) a feeding device, which feeding device includes an inlet for a slurry of said burned lime and a first part of said soda liquor, or inlets for said burned lime and said first part of said soda liquor, respectively, for enabling formation of said slurry inside said feeding device,
 (bb) one or more pump(s), which are arranged to pump the slurry from the feeding device in (aa) to said reaction vessel,
 (cc) a heater, which is arranged to heat a second part of said soda liquor,
 (dd) a distributing device, which is arranged to distribute said first part of said soda liquor to the feeding device in (aa) and to distribute said second part of said soda liquor to the heater in (cc), and
 (ee) a combining device, which is arranged to combine said slurry, before or in connection with its inlet into said reaction vessel, with said heated second part of said soda liquor.

The advantages of the feeding device and the process described above are several:

The pump-in feed system allows the burned lime storage silo to be placed lower than in a conventional system where the lime is added by gravity to the first of several reactor tanks.

The pump-in feed system utilizing the feeding device allows the burned lime storage silo to be placed away from the reactor tank also facilitating retrofits of this system in existing plants.

The very high reaction rate of this process compared to the conventional makes the required reactor volume much smaller and thus gives lower space requirement and also lower equipment cost.

The high reaction rate makes feed-back control of the lime dosage more accurate as the time lag from dosing to completed reaction is greatly reduced.

The small reactor dimensions and fully pressurized reactor design greatly reduces the heat losses and thus makes control of the lime dosing based on measurement of the temperature rise caused by the exothermic slaking reaction (1) an accurate and simple control mechanism.

The high temperature during the white liquor/lime mud separation makes the filter area required smaller and thus reduces the size and cost of this filter.

BRIEF DESCRIPTION OF THE DRAWINGS

The present invention is hereinafter described in more detail with reference to the drawings, of which.

DETAILED DESCRIPTION

Figure 1:
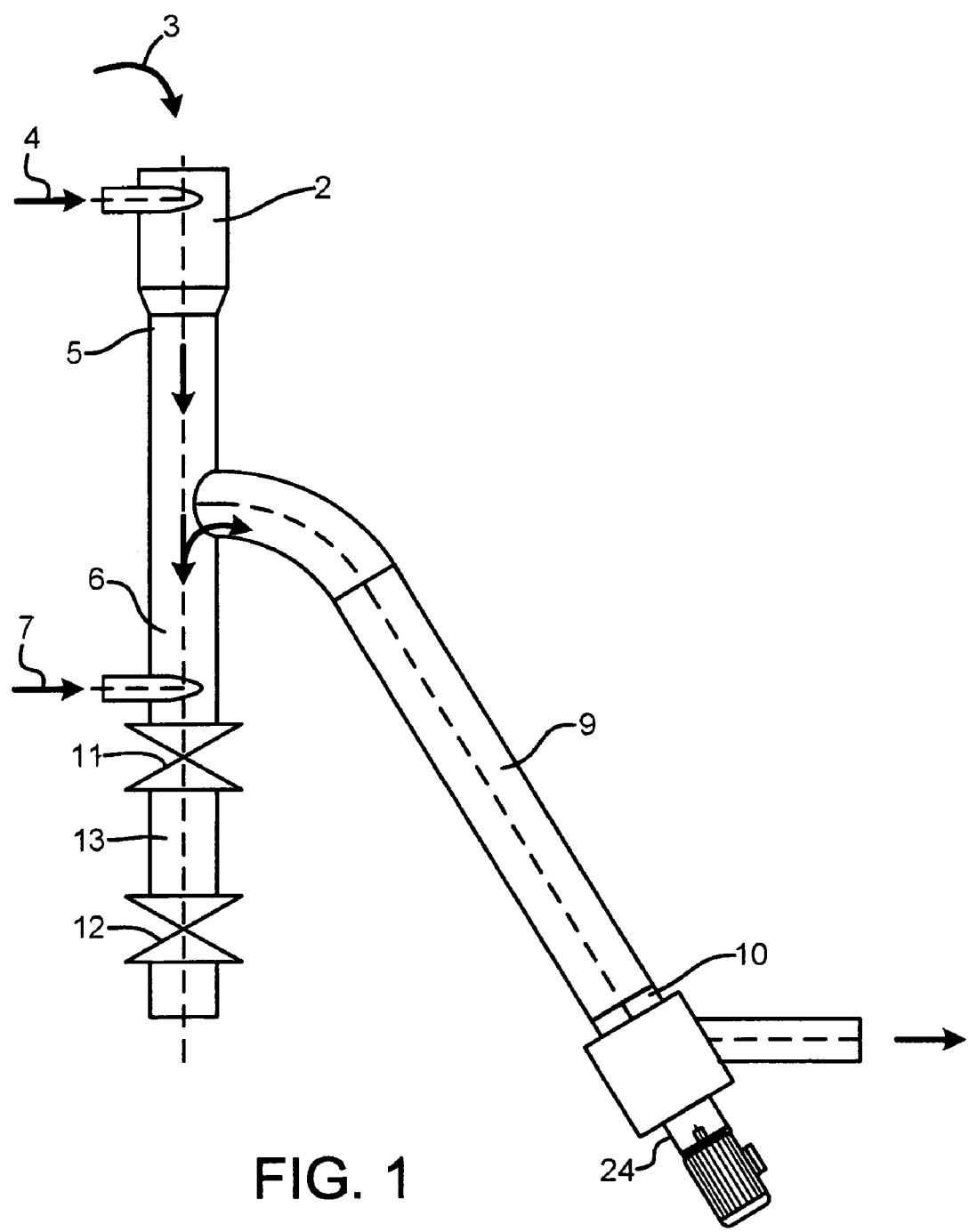
FIG. 1 is showing one embodiment of a feeding device according to the invention.

Detail no. 1 in FIG. 1 denotes an embodiment of a feeding device according to the invention. The feeding device generally comprises a cyclone 2 in its upper part, including inlets 3, 4 for burned lime and soda liquor, respectively. Preferably, the inlet 4 for soda liquor is arranged tangentially, so that there is formed a curtain of liquor around the burned lime which is falling down, which liquor curtain assists in preventing dusting. The soda liquor normally constitutes of green liquor, which preferably has been clarified, but also white liquor may be used. The outlet 5 of the cyclone 2 is attached to a trash trap 6. The trash trap 6 extends as a vertical pipe which is aligned with the outlet 5 of the cyclone 2 and which in its lower part comprises a preferably tangential inlet 7 for soda liquor. The trash trap further comprises feed-out means for coarse burned lime or other contaminating solids, which feed-out means in the shown embodiment includes two intermittently operating sliding damper valves 11, 12. It is to be understood that a variety of other feed-out means are conceivable, including a large number of valve types. In the shown embodiment, there is used two valves 11, 12 in order to create a lock system, where the valve 11 is opened first so that trash may fall down by gravity into a lock chamber 13. The valve 11 is then closed and the valve 12 is instead opened in order to empty the lock chamber 13.

The trash trap 6 is branched in its upper part and the branch-off pipe constitutes the feed vessel 9 according to the invention. The feed vessel is of tall and slender shape, according to the above mentioned, and is generally referred to as a stand pipe, although it need not be exactly vertical as conventional standpipes usually are. Instead, the longitudinal axis of the feed vessel/standpipe 9 according to the invention may differ from the vertical plane with as much as 45°, preferably at most 35°. The feed vessel provides a small volume, and thereby a short retention time at the same time as it provides a hydrostatic pressure height (net pressure suction height) which is high enough to prevent boiling due to the exothermic slaking reaction and to prevent cavitation in the downstream pump. At the lower end of the feed vessel 9 there is provided an outlet 10.

Operatively connected to the outlet 10 of the feed vessel 9, there are one or more pumps, preferably two pumps, the first 24 of these pumps preferably being directly connected to the outlet 10. The first 24 of these pumps is also preferably designed to crush oversized burned lime between a rotor part thereof and a stationary part thereof. Both or all of the pumps are besides this also designed to be able to pump the slurry of lime and soda liquor even if it contains substantial amounts of coarse burned lime. Further, the first (primary) pump is preferably selected to have a low net pressure suction height requirement and a low pressure rise, whereas the second pump is a so called booster pump with a higher net pressure suction height requirement, which is easily met through the pressure rise of the first pump, and also with a higher pressure rise. The second, and any optional further pump is preferably selected to be a conventional, commercial rubber lined pump for mineral suspensions.

In the cyclone 2, or just below the cyclone 2, there is formed a slurry of the entering burned lime and clarified green liquor. The slurry discharges by gravity into the trash trap 6. At the bottom of the trash trap a second portion of the green liquor is tangentially added 7 in order to mix the slurry and to flush small particles from the trap into the feed vessel 9. Alternatively, the trash trap may be provided with an agitator device in its lower part. The overflow from the trash trap 6 flows into the feed vessel 9. The trash trap is periodically emptied from coarse solids by opening a large diameter discharge valve at its bottom. The slurry in the feed vessel proceeds through the outlet 10 into the downstream pump (FIG. 2).

Figure 2:
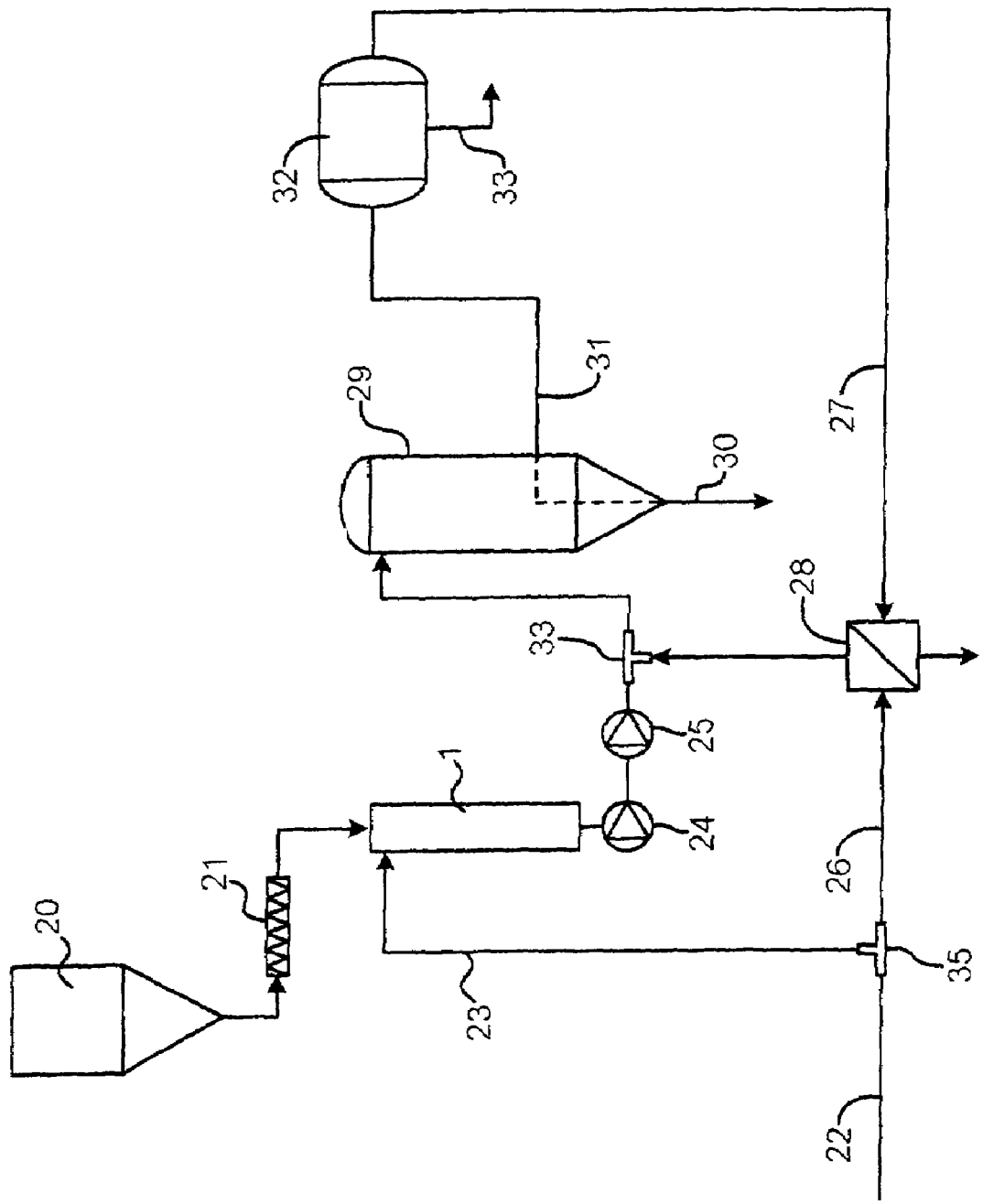
FIG. 2 is showing a schematic flow chart of one embodiment of a process according to the invention.

Turning now to FIG. 2, showing a flow chart of an embodiment of the process according to the invention, detail no. 20 denotes a storage tank for burned (sometimes referred to as re-burned) lime, which is being fed in from a lime kiln (not shown). From the storage tank 20 the burned lime is conveyed by a solids material conveyor 21 to the top of the feeding device 1. In the feeding device 1 there is formed a slurry of a first part 23 of the green liquor 22 and the burned lime. The flow in conduit 22 is typically about 1000-8000 $m^3$ green liquor per 24 hours and the lime dosage from storage tank 20 is about 55-75 $kg/m^3$ green liquor. Preferably about ⅓ to ½ of the green liquor provided in 22 is added 23 to the feeding device 1. The temperature of the green liquor which is supplied 23 to the feeding device is typically 90-97° C., although lower temperatures are conceivable. The slurry of burned lime and green liquor proceeds through the short retention time feeding device 1, the slaking reaction commencing, and pumps 24 and 25 according to the above description. A second part 26 of the green liquor in 22 is heated, preferably by indirect heat exchanging in heat exchanger 28 against a product white liquor 27, before being brought together, in a combining device 34, with the slurry downstream of the pumps 24 and 25. The slurry and the second, preheated part of the green liquor may be combined either prior to the entry in a pressurized, high temperature causticizing reactor 29, or by separate inlets, inside the reactor. The temperature increase compared to the conventional atmospheric process, achieved by the preheating of the green liquor in combination with the heat of reaction of the slaking reaction will make the causticizing reaction proceed at an increased rate to complete the reactions in a time which is much shorter than the conventional reaction time.

The green liquor 22 is divided into said first 23 and second 26 parts by a distributing device 35, which may be a conventional tee-conduit or other similar device, including a valve (not shown), which controls the flow rate in the conduit for the first part 23 and the conduit for the second part 26. Also, the combining device 34 may be a tee-conduit, a mixer, or other similar device. It is however also conceivable that the combination of the slurry and the pre-heated green liquor is performed directly in or in connection with a pump, such as one of the pumps 24 or 25. Whereby the pre-heated green liquor from heater 28 may be introduced into said pump via an inlet therein. Also, as described above, the combination may be performed directly in or in connection with the reactor 29.

The pressurized causticizing reactor 29 may be of known design, having intermediate partitions and scraping devices/agitators. The pressure in the reactor is suitably at least 1.1 bar(abs), preferably at least 1.5 bar and more preferred at least 2 bar and the temperature is 100-160° C., preferably 110-150° C. and more preferred 120-140° C.

When the causticizing reaction is completed, the resulting white liquor/lime mud slurry is led through a gravity settling zone in the bottom part of the reactor where any remaining course material, so called grits, is separated from the mud slurry and discharged through a discharge device into conduit 30, or directly into a (not shown) vessel for washing and dewatering. The main portion of the slurry is led from the upper part of the settling zone, via a conduit 31, to a pressurized filter 32, preferably a pressure disc filter, which preferably operates at essentially the same temperature as the prevailing temperature in reactor 29. In the filter 32, the lime mud 33 is separated from the product white liquor 27, whereafter the white liquor is used to preheat the second part 26 of the incoming green liquor 22, and further used in the cooking process for the cellulose containing raw material. The green liquor in 26 is suitably heated to a temperature about 5-10° C.

below the temperature in reactor 29. The lime mud in 33 is slurried in hot water (not shown) and led away from the filter 32.

According to one aspect of the invention, both the feeding device 1 and the reactor 29 are placed with their support structure on the ground plane, the outlet for the grits 30 being located about 1.5-2 meters above the ground and the storage tank 20 for burned lime having its outlet located about 6-7 meters above the ground.

The invention is not limited to the above shown embodiment, but may be varied within the scope of the claims. Thus, the skilled man will easily see several modifications which can be made without departing from the scope of the claims. Thus, he will for example realize that the slurry in the feeding device can be accomplished by other means than the shown cyclone and also that the second part of the green liquor, which is preheated, can be preheated by other means than the shown heat exchange against product white liquor. Further, the skilled man will realize that the feed-in system, including the feeding device, can be used also for not pressurized applications as an alternative to conventional expensive conveyors for dry materials.

We claim:

1. A method for feeding burned lime and soda liquor to a reaction vessel, comprising:

providing a feeding device having a cyclone with an upper inlet, a first tangential inlet and an outlet defined therein, a trash trap in a form of a vertical pipe directly connected to the outlet of the cyclone, the trash trap having a second tangential inlet defined therein in a lower part of the trash trap, a feed vessel connected to an upper part of the trash trap, the feed vessel having an inlet and an outlet defined therein with the inlet of the feed vessel connected to the upper part of the trash trap;

feeding burned lime into the upper inlet of the cyclone;

feeding soda liquor into the first tangential inlet of the cyclone;

forming a slurry of the burned lime and the soda liquor inside the cyclone and dissolving a portion of the burned lime;

discharging the slurry passed the inlet of the feed vessel and into the trash trap;

feeding soda liquor into the second tangential inlet of the trash trap;

mixing the soda liquor from the second tangential inlet with the slurry in the trash trap to dissolve un-dissolved particles of the burned lime that were not dissolved in the cyclone and flushing particles from the trash trap into the inlet of the feed vessel at the upper part of the trash trap;

forming an overflow of the mixed slurry in the trash trap; and flowing the overflow of the mixed slurry into the inlet of the feed vessel.

2. The method according to claim 1 wherein the method further comprises the trash trap discharging coarse burned lime through a first feed-out valve located at a bottom part of the trash trap.

3. The method according to claim 2 wherein the method further comprises the trash trap discharging the coarse burned lime into a lock chamber.

4. The method according to claim 3 wherein the method further comprises the trash trap discharging the coarse burned lime from the lock chamber through a second feed-out valve.

5. The method according to claim 1 wherein the method further comprises the trash trap agitating the mixed slurry disposed in the trash trap.

6. The method according to claim 1 wherein the method further comprises providing a pump for crushing oversized burned lime between a rotor part of the pump and a stationary part of the pump.

7. The method according to claim 1 wherein the method further comprises feeding soda liquor into an agitator disposed in the trash trap.

8. The method according to claim 1 wherein the method further comprises discharging the slurry into the trash trap by gravity.

9. The method according to claim 1 wherein the method further comprises flushing small particles of burned lime from the trash trap into the feed vessel.

* * * * *